(12) United States Patent
Dierksmeier et al.

(10) Patent No.: US 10,794,213 B2
(45) Date of Patent: Oct. 6, 2020

(54) BLADE TIP CLEARANCE CONTROL FOR AN AXIAL COMPRESSOR WITH RADIALLY OUTER ANNULUS

(71) Applicant: Rolls-Royce North American Technologies, Inc., Indianapolis, IN (US)

(72) Inventors: Douglas D. Dierksmeier, Franklin, IN (US); Edward C. Rice, Indianapolis, IN (US); Ryan C. Humes, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 1009 days.

(21) Appl. No.: 15/398,206

(22) Filed: Jan. 4, 2017

(65) Prior Publication Data
US 2018/0112550 A1 Apr. 26, 2018

Related U.S. Application Data

(63) Continuation-in-part of application No. 15/384,135, filed on Dec. 19, 2016, and a continuation-in-part of application No. 15/384,190, filed on Dec. 19, 2016, and a continuation-in-part of application No. 15/384,161, filed on Dec. 19, 2016, and a continuation-in-part of application No. 15/188,721, filed on Jun. 21, 2016.

(51) Int. Cl.
*F01D 11/22* (2006.01)
*F01D 11/20* (2006.01)
*F04D 29/16* (2006.01)
*F04D 27/02* (2006.01)

(52) U.S. Cl.
CPC .............. *F01D 11/20* (2013.01); *F01D 11/22* (2013.01); *F04D 27/0246* (2013.01); *F04D 29/164* (2013.01); *Y02T 50/672* (2013.01)

(58) Field of Classification Search
CPC ................................. F01D 11/20; F01D 11/22
See application file for complete search history.

(56) References Cited

U.S. PATENT DOCUMENTS

| 7,575,409 | B2 * | 8/2009 | Dierksmeier | ........... F01D 11/22 415/1 |
| 8,608,435 | B2 * | 12/2013 | Bock | ........................ F01D 11/22 415/173.3 |

(Continued)

FOREIGN PATENT DOCUMENTS

WO 2003/089792 A1 10/2003

*Primary Examiner* — Kayla McCaffrey
(74) *Attorney, Agent, or Firm* — Barnes & Thornburg LLP

(57) ABSTRACT

A compressor shroud assembly in a turbine engine having a dynamically moveable shroud for encasing a rotor segment. The rotor segment comprises a bladed disc. The compressor shroud assembly maintains a clearance gap between the shroud and the blade tips of the bladed disc. The assembly comprises a static compressor casing, a shroud mounted to the casing, and an actuator mounted to the casing. The shroud comprises a flowpath boundary member spaced radially inward from the casing, the flowpath boundary member being moveable relative to the casing in a radial direction. The actuator is coupled to the shroud for effecting the movement of the flowpath boundary member.

19 Claims, 15 Drawing Sheets

(56) References Cited

U.S. PATENT DOCUMENTS

| | | | |
|---|---|---|---|
| 8,944,756 B2 * | 2/2015 | Lagueux | F01D 11/22 415/113 |
| 9,458,855 B2 * | 10/2016 | Dierksmeier | F01D 11/24 |
| 10,316,686 B2 * | 6/2019 | Hudson | F01D 11/22 |
| 2004/0120809 A1 * | 6/2004 | Loftus | F01D 11/22 415/173.2 |
| 2013/0034423 A1 * | 2/2013 | Adaickalasamy | F01D 11/18 415/1 |
| 2014/0157757 A1 | 6/2014 | Hasel et al. | |

* cited by examiner

BLADE TIP CLEARANCE CONTROL FOR AN AXIAL COMPRESSOR WITH RADIALLY OUTER ANNULUS

CROSS REFERENCE TO RELATED APPLICATIONS

The present application is a continuation-in-part of U.S. patent application Ser. No. 15/188,721 filed Jun. 21, 2016; U.S. patent application Ser. No. 15/384,135 filed Dec. 19, 2016; U.S. patent application Ser. No. 15/384,161 filed Dec. 19, 2016; and U.S. patent application Ser. No. 15/384,190 filed Dec. 19, 2016 the entirety of which are hereby incorporated by reference.

FIELD OF THE DISCLOSURE

The present disclosure relates generally to fluid compression, and more specifically to an axial compressor.

BACKGROUND

Axial-flow compressors are used in a variety of applications to compress a fluid from an inlet pressure to a discharge pressure which is higher than inlet pressure. Axial compressors typically comprise a rotatable assembly of a plurality of blades mounted to a rotor and a static assembly of a plurality of vanes mounted to a casing. The cross-sectional area of the fluid passage in an axial compressor typically decreases as the fluid travels from inlet to discharge. In operation, the rotating blades accelerate the fluid into a diminishing cross-sectional area, thus compressing or pressurizing the fluid.

Applications of axial compressors include, but are not limited to, gas turbine engines including those used in air-, land-, and sea-based applications for providing electrical generation and/or propulsion, expendable machines such as for missile propulsion systems, and other rotating machinery generally. In many applications there is a need in the art for axial compressors which can be achieved at a lower cost of manufacture and operation. Efforts to reduce the cost of manufacture have included, for example, the substitution of metal engine components with those made of lightweight composite materials which tend to be less expensive to procure and machine to achieve the desired compressor components. However, material substitution alone is insufficient to achieve the desired cost savings when manufacturing and operating an axial compressor, particularly for expendable applications where the manufacturing cost is lost after a single use.

It is thus desired for an improvement in the art of manufacturing and operating axial compressors to provide less expensive alternatives to existing designs.

SUMMARY

The present application discloses one or more of the features recited in the appended claims and/or the following features which, alone or in any combination, may comprise patentable subject matter.

According to an aspect of the present disclosure, a compressor shroud assembly is disclosed in a turbine engine having a dynamically moveable shroud segment for encasing a rotor segment. The rotor segment comprises a bladed disc in an axial compressor. The compressor shroud assembly maintains a clearance gap between the shroud segment and the blade tips of the bladed disc. The assembly comprises a static compressor casing, a shroud segment mounted to the casing, and an actuator mounted to the casing. The shroud segment comprises a flowpath boundary member spaced radially inward from the casing, the flowpath boundary member being moveable relative to the casing in a radial direction. The actuator is coupled to the shroud segment for effecting the movement of the flowpath boundary member.

In some embodiments the flowpath boundary member comprises a ring configured for radial flexion. In some embodiments the flowpath boundary member comprises a split ring having a slideable overlapping portion. In some embodiments the flowpath boundary member comprises a ring having portion configured for radial flexion. In some embodiments the flowpath boundary member comprises a ring formed from a material having sufficient flexion to effect movement of the member in a radially outward direction when the member is radially flexed.

In some embodiments the flowpath boundary member is mounted to the casing by a plurality one or more tangs, each of the tangs being configured for radial flexion relative to said casing. In some embodiments the flowpath boundary member and the tangs at least partially bound an annular chamber, and wherein the actuator operates to direct pressurized air into the annular chamber.

In some embodiments the actuator operates to direct compressor discharge air into the annular chamber. In some embodiments the actuator comprises an actuating ring coupled to the flowpath boundary member, the actuating ring comprising a material having a different rate of thermal expansion than the material comprising the flowpath boundary member.

In some embodiments the actuating ring is mechanically driven to thereby effect movement of the flowpath boundary member. In some embodiments the assembly further comprises a sensor for measuring a clearance gap between the flowpath boundary member and the blade tips of the bladed disc and providing an output, wherein the actuator operates responsive to the sensor output.

According to another aspect of the present disclosure, an axial compressor in a turbine engine comprises a rotatable shaft forming an axis of the engine, a rotor segment having a bladed disk mounted to the shaft, a static casing providing a rigid outer frame for the compressor, a shroud segment mounted to the casing, and an actuator. The shroud segment has an annular boundary member spaced radially inward from the casing and forming a flowpath boundary around the bladed disk, the annular boundary member being configured to radially expand and contract. The actuator is configured to radially expand and contract the annular boundary member.

In some embodiments the axial compressor further comprises a pneumatic piston. In some embodiments the piston is actuated by air directed from the compressor discharge. In some embodiments the piston comprises an actuating chamber bounded at least in part by the annular boundary member.

In some embodiments the actuator comprises an actuating ring coupled to the annular boundary member. In some embodiments the actuating ring is mechanically driven to thereby radially expand or contract the annular boundary member. In some embodiments the actuator ring comprises a material having a rate of thermal expansion different than the annular boundary member.

In some embodiments the axial compressor further comprises a sensor for measuring a clearance gap between the annular boundary member and the blade tips of the bladed disc and providing an output, wherein the actuator operates responsive to the sensor output.

According to yet another aspect of the present disclosure, a method is provided of reducing blade tip rub in an axial compressor having a static casing and a rotating bladed disk. The method comprises providing a shroud segment spaced radially inward from the casing and forming a flowpath boundary around the bladed disk, and radially expanding and contracting the shroud segment. In some embodiments the method further comprises measuring a clearance gap between the blade tips of the rotating bladed disk and the shroud segment; and radially expanding and contracting the shroud segment responsive to the measured clearance gap.

BRIEF DESCRIPTION OF THE DRAWINGS

The following will be apparent from elements of the figures, which are provided for illustrative purposes and are not necessarily to scale.

Figure 1A:
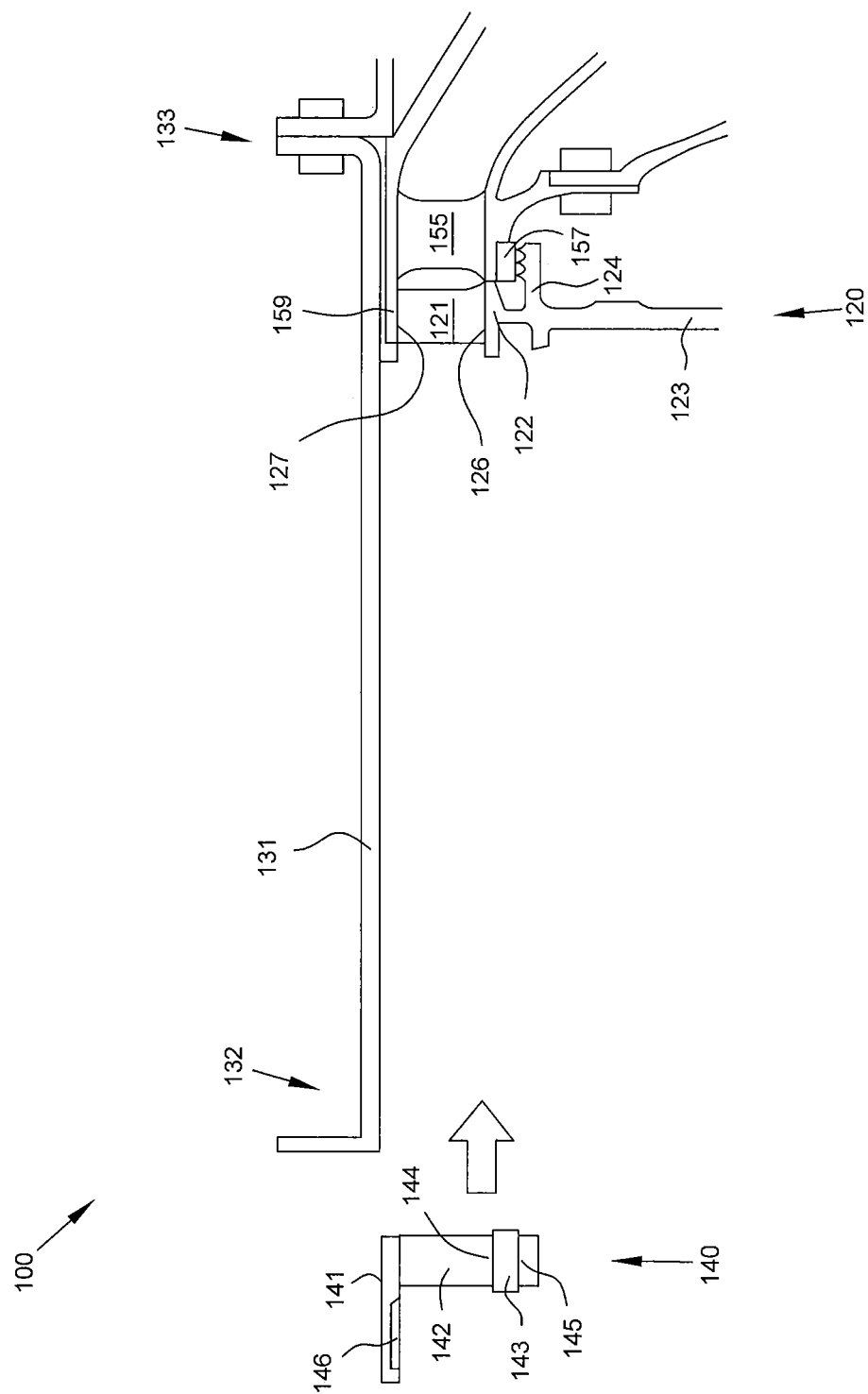
FIG. 1A is a side cutaway view of a partially-assembled axial compressor in accordance with some embodiments of the present disclosure.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of illustrative embodiments illustrated in the drawings and specific language will be used to describe the same.

This disclosure presents systems and methods of manufacturing and assembling an axial compressor to achieve a less expensive compressor than is currently available in the art. More specifically, the present disclosure is directed to an axial compressor which comprises a tubular casing which encases a rotatable shaft, at least one rotor segment coupled to the rotatable shaft and comprising a bladed disc, and at least one banded stator segment comprising a plurality of stator vanes extending between an outer flowpath ring and an inner flowpath ring. The rotor segments and stator segments are inserted into the casing in alternating fashion. A method of assembling an axial compressor is further presented, the method comprising installing a rotor segment inside a tubular compressor casing, installing a vane segment adjacent the installed rotor segment, and repeating the steps of installing a rotor segment and vane segment until a desired number of rotor segment and vane segment pairs are installed.

Figure 1B:
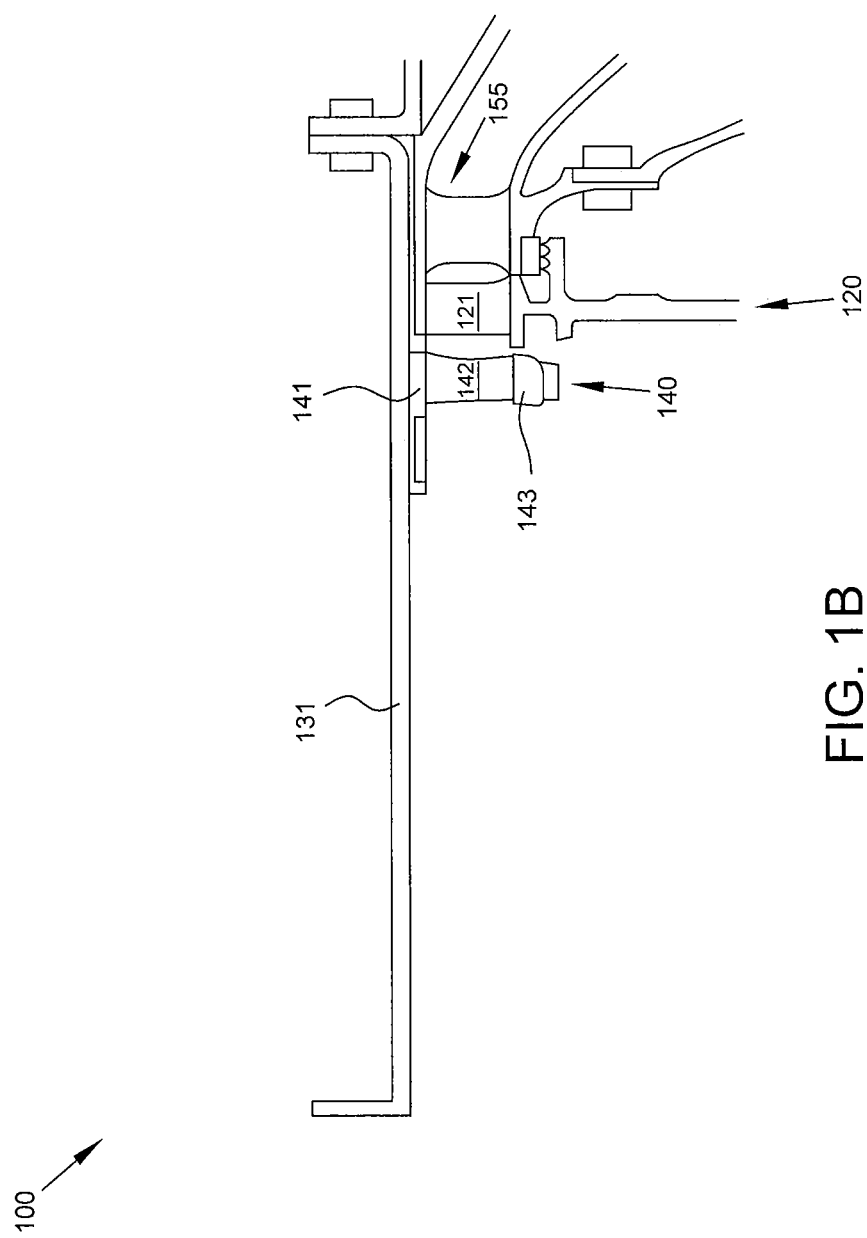
FIG. 1B is a side cutaway view of a partially-assembled axial compressor in accordance with some embodiments of the present disclosure.
Figure 1C:
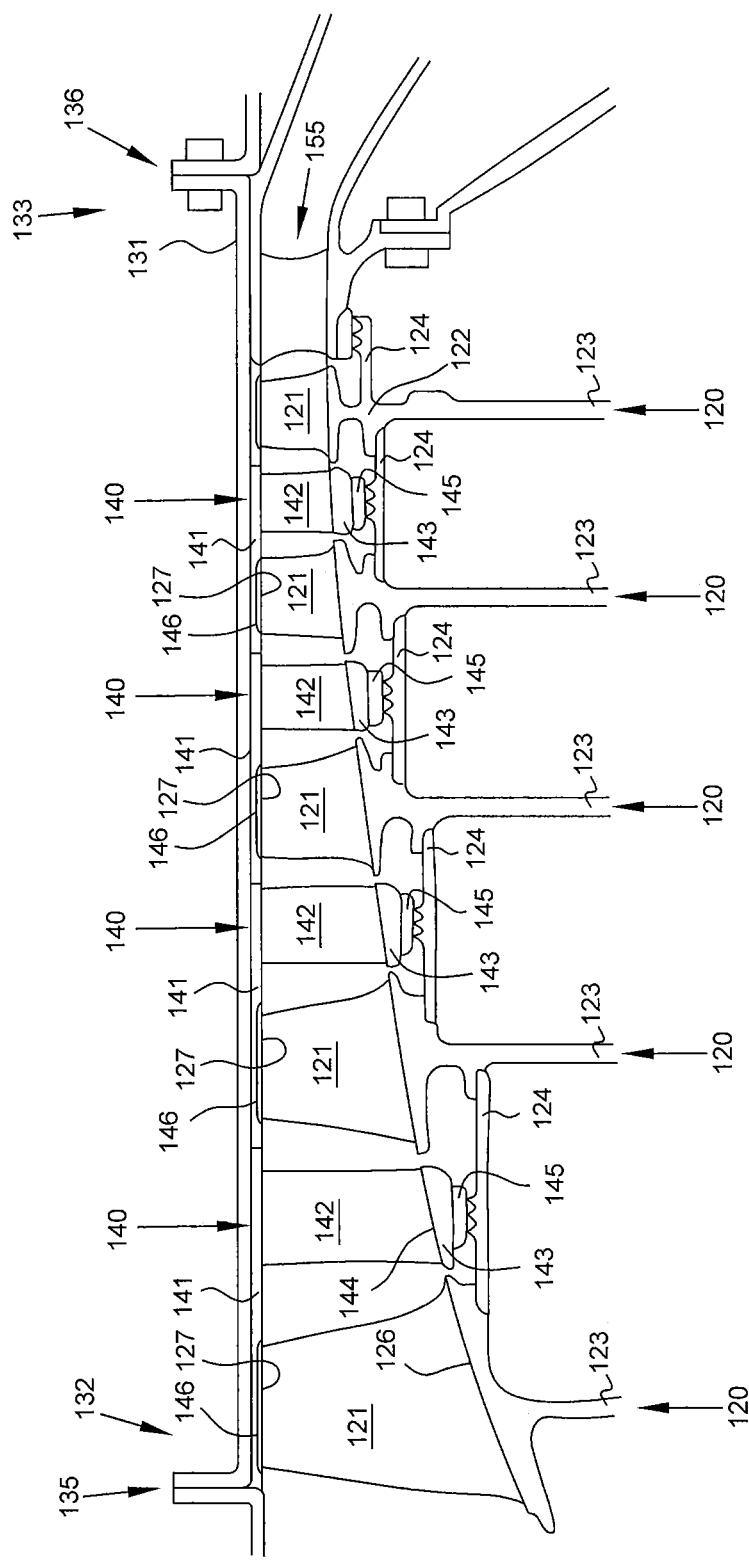
FIG. 1C is a side cutaway view of an axial compressor in accordance with some embodiments of the present disclosure.

FIGS. 1A through 1C present illustrations of the assembly process for the disclosed an axial compressor 100. FIGS. 1A and 1B show views of a partially assembled axial compressor 100, while a fully assembled axial compressor 100 is shown in FIG. 1C.

An axial compressor 100 comprises a rotatable assembly 110 and a static assembly 130. The rotatable assembly 110 may be coupled to a shaft and adapted to rotate about an axis of rotation. The rotatable assembly 110 comprises a plurality of rotor segments 120. The static assembly 130 comprises a casing 131 which encases the rotatable assembly 110 and a plurality of stator segments 140 disposed in the casing 131.

A fluid flow path is defined through the axial compressor 100 between the casing 131 and a radially inner flow boundary 134 formed by the rotor segments 120 and stator segments 140. As fluid passes from an axially forward end of the compressor 100 to an axially aft end, it passes between blades 121 of the rotor segments 120 and stator vanes 141 of the stator segments 140.

Casing 131 may be a tubular casing or a cylindrical casing, and in some embodiments may be tapered from one axial end to the other axial end. Casing 131 may comprise a first end 132 and second end 133, with the first end 132 being axially forward of the second end 133. In some embodiments casing 131 is conical. A conical casing 131 may have a smaller radius at second end 133 than at first end 132. In some embodiments casing 131 may be formed by a rolled ring forging or a rolled and welded plate stock. In some embodiments casing 131 may be formed by casting or by a composite and resin method such as a wound composite fiber coated with resin and cured.

Casing 131 may be configured to contain axial fluid flow from first end 132 to second end 133. In other embodiments casing 131 may be configured to contain axial fluid flow from second end 133 to first end 132. Casing 131 may be adapted to encase a plurality of rotor segments 120, a plurality of stator segments 140, and a shaft 150. Casing 131 may be joined by forward and aft flanges 135, 136 to additional machine components.

A plurality of rotor segments 120 are disposed inside casing 131. In some embodiments each rotor segment 120 comprises a bladed disc having a plurality of blades 121 coupled to a disc portion 123. Disc portion 123 may be adapted for coupling to shaft 150. In some embodiments each rotor segment 120 comprises a blade 121 coupled to an annular ring 122 having a disc portion 123 for connecting the rotor segment 120 to the shaft 150. Each rotor segment 120 may be referred to as a stage of the compressor.

In some embodiments rotor segment includes an axially-extending sealing arm 124. Sealing arm 124 may be formed integrally with the annular ring 122 or may be formed separately and coupled to annular ring 122. In some embodiments sealing arm 124 may have a plurality of annular knife edges 125 extending radially outward and adapted to engage a portion of a stator segment 140 in order to effectively form a seal. The seal may be referred to as a knife edge seal. In some embodiments the seal formed is a labyrinth seal.

During operation, rotor segments 120, including any sealing arms 124, rotate with shaft 150. The motion of blades 121 drives fluid from the axially forward first end 132 to the axially aft second end 133.

A plurality of stator segments 140 are disposed inside casing 131. Each stator segment 140 comprises an outer flowpath ring 141, an inner flowpath ring 143, and a plurality of stator vanes 142 extending between the outer flowpath ring 141 and inner flowpath ring 143. Stator vanes 142 may be spaced about the circumference of outer flowpath ring 141 and inner flowpath ring 143. Stator segments 140 may be referred to as a banded stator segment, as the stator vane 142 and fluid flow may be banded between outer flowpath ring 141 and inner flowpath ring 143. Each stator segment 140 may be referred to as a stage of the compressor.

In some embodiments, stator vanes 142 are hot upset to one or both of outer flowpath ring 141 and inner flowpath ring 143. During hot upset processing, one or more tangs extending from the end of a stator vane 142 is inserted into one or more slots, respectively, of a flowpath ring. The tang is heated and then deformed to couple the stator vane 142 to the flowpath ring.

Outer flowpath ring 141 is annular and may extend axially forward or aft such that outer flowpath ring 141 is disposed radially outward from one or more adjacent rotor segments 120. Outer flowpath ring 141 may be adapted to couple with casing 131, for example through a tongue and groove, a keyway, or the use of tangs as described in greater detail below. In some embodiments outer flowpath ring 141 includes an abradable ring 146 adapted to ensure that the tip of a blade 121 does not impinge the casing 131 or the outer flowpath ring 141. Abradable ring 146 may be formed from a material which is softer or more maleable than the materials which form the casing 131 or the outer flowpath ring 141. Abradable ring 146 is radially disposed between the blade tips 127 of one of the rotor segments 120 and the casing 131.

Inner flowpath ring 143 is annular and may include a radially inward facing sealing member 145 which is adapted to engage a portion of a sealing arm 124 of a rotor segment 120. In some embodiments sealing member 145 engages a plurality of knife edges 125 extending from sealing arm 124 to form a labyrinth seal. In some embodiments sealing member 145 may be formed as an annular ring. In other embodiments, sealing member 145 comprises a coating applied to inner flowpath ring 143.

During operation, stator segments 140 remain fixed or stationary.

Rotor segments 120 and stator segments 140 are disposed inside casing 131 in alternating fashion, such that stator segments 140 are disposed between a pair of rotor segments 120. In some embodiments, such as that shown in FIG. 1C, axial compressor 100 comprises five rotor segments 120 and four stator segments 140. In other embodiments rotor segments 120 and stator segments 140 are disposed in pairs and thus an equal number of rotor segments 120 and stator segments 140 are disposed inside casing 131. Each rotor segment 120 and stator segment 140 pair may be referred to as a stage of the compressor.

A radially inner flow boundary 134 is formed by the annular surface 126 of ring 122 of rotor segment 120 and the annular surface 144 of inner flowpath ring 143 of stator segment 140. The flow boundary 134 may be interrupted by various cavities adjacent the seals between the rotor segments 120 and stator segments 140.

In some embodiments a fluid diffuser 155 is disposed in second end 133 and further defines the fluid flowpath in the axially aft direction. Diffuser 155 may comprise a sealing member 157 adapted to engage at least a portion of a sealing arm 124 of a rotor segment 120. In some embodiments sealing member 157 engages a plurality of knife edges 125 extending from sealing arm 124 to form a labyrinth seal. In some embodiments sealing member 157 may be formed as an annular ring. In other embodiments, sealing member 157 comprises a coating applied to diffuser 155. Diffuser 155 may further comprises a plurality of guide vanes.

In some embodiments the plurality of rotor segments 120 and stator segments 140 may be held in compression by a compressive element, for example a threaded bolt between first end 132 and second end 133 of casing 131.

In some embodiments spacers (not shown) may be included between one or more of the plurality of rotor segments 120 and stator segments 140.

In some embodiments one or more of the plurality of blades 121 and stator vanes 142 are fabricated using stamping, injection molding including metal injection molding, and/or composite and resin fabrication. In some embodiments blades 121 are coupled to annular ring 122 using brazing, welding, or adhesive. In some embodiments stator vanes 142 are coupled between outer flowpath ring 141 and inner flowpath ring 143 using brazing, welding, or adhesive.

With reference now to FIG. 1A, the assembly of the disclosed axial compressor will be described. FIG. 1A is a side cutaway view of a partially-assembled axial compressor 100. As shown in FIG. 1A, a diffuser segment 155 is initially installed at second end 133 of casing 131. Diffuser segment 155 may act as a backstop which prevents axially aft movement of rotor segments 120 and stator segments 140. In some embodiments diffuser segment 155 comprises an abradable ring 159 which extends axially forward and is disposed radially outward from a rotor assembly 120.

A rotor assembly 120 is inserted into casing 131 at first end 132 and moved axially aft toward second end 133. When in position, a sealing arm 124 may extend from rotor assembly 120 and engage a sealing member 157 of diffuser segment 155.

Following the insertion and position of rotor assembly 120, as shown in FIG. 1A a stator segment 140 is inserted into casing 131 at first end 132 and moved axially aft toward second end 133. FIG. 1B is a side cutaway view of a partially-assembled axial compressor 100 and shows the stator segment 140 which was inserted in FIG. 1A in a final position. In some embodiments stator segment 140 may be positioned adjacent the axially-forward side of rotor segment 120. In some embodiments stator segment 140 may be positioned abutting the axially-forward side of rotor segment 120. As shown in FIG. 1B, stator segment 140 comprises an abradable ring 146 which extends axially forward to be disposed between a subsequently-inserted rotor portion 120 and casing 131. In some embodiments stator segment 140 may include an abradable ring 146 which extends axially aft to be disposed between the previously-inserted rotor portion 120 and casing 131.

Once the stator segment 140 is positioned as shown in FIG. 1B, additional rotor segments 120 and stator segments 140 are inserted into casing 131 at first end 132 and moved axially aft toward second end 133. Rotor segments 120 and stator segments 140 are positioned in alternating fashion.

FIG. 1C is a side cutaway view of an axial compressor 100 following the assembly process as described above with reference to FIGS. 1A and 1B.

Figure 2:
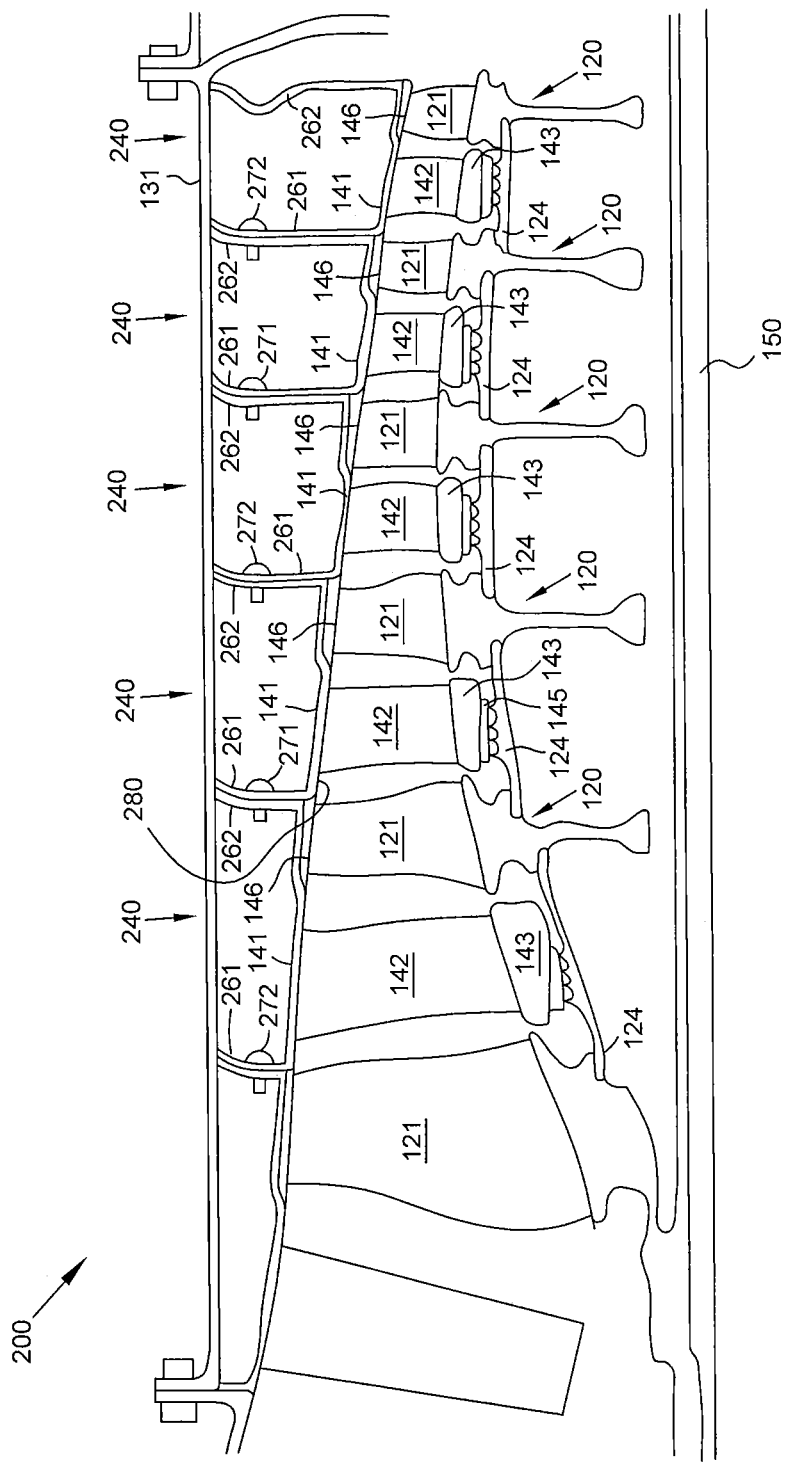
FIG. 2 is a side cutaway view of an axial compressor in accordance with some embodiments of the present disclosure.

FIG. 2 is a side cutaway view of an axial compressor 200 in accordance with some embodiments of the present disclosure. Axial compressor 200 comprises a plurality of rotor segments 120 and stator segments 240 disposed inside a compressor casing 131. Rotor segments 120 are coupled to rotatable shaft 150.

Stator segments 240 comprise an outer flowpath ring 141, an inner flowpath ring 143, and a plurality of stator vanes 142 extending between the outer flowpath ring 141 and inner flowpath ring 143. Stator vanes 142 may be spaced about the circumference of outer flowpath ring 141 and inner flowpath ring 143.

Stator segments 240 further comprise a pair of opposing tangs 261, 262 extending radially outward from the outer flowpath ring 141 in order to space the outer flowpath ring 141 radially inward from the casing 131. Tangs 261 and 262 have curved ends which are configured to engage casing 131 and assist in maintaining the position, once assembled, of stator segments 240. In some embodiments adjacent stator segments 240 may be coupled using one or more fasteners 271, 272. In some embodiments fasteners 271 and 272 may be used to fasten adjacent or abutting tangs 261, 262. In some embodiments fasteners 271 and 272 comprise pins which prevent rotation of stator segments 140 during operation.

Outer flowpath ring 141 is annular and may extend axially forward or aft such that outer flowpath ring 141 is disposed radially outward from one or more adjacent rotor segments 120. In some embodiments outer flowpath ring 141 includes an abradable ring 146 adapted to ensure that the tip of a blade 121 does not impinge the casing 131 or the outer flowpath ring 141. Abradable ring 146 may be formed from a material which is softer or more maleable than the materials which form the casing 131 or the outer flowpath ring 141. Abradable ring 146 is radially disposed between the blade tips 127 of one of the rotor segments 120 and the casing 131.

An outer flow boundary 280 is formed by the radially inner surfaces of each stator segment 240.

Figure 3:
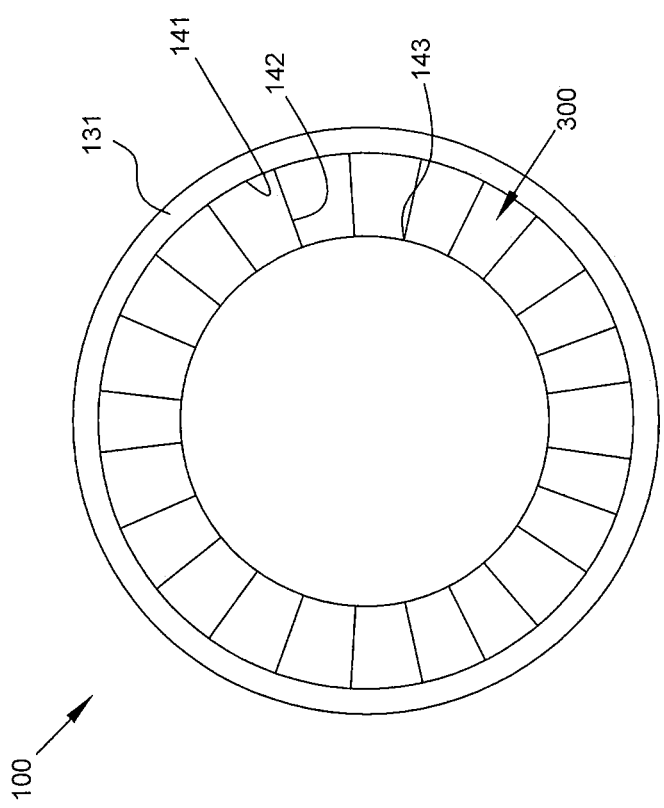
FIG. 3 is an axial profile view of an axial compressor in accordance with some embodiments of the present disclosure.

FIG. 3 is an axial profile view of an axial compressor 100 viewed from an axially forward position and looking in an axially aft direction. The axial cross-section shown in FIG. 3 is taken at a stator segment 140. Compressor 100 is defined in the radially outward direction by casing 131. A fluid flowpath 300 is partially bounded in a radially outward dimension by the radially inner surface of outer flowpath ring 141 and is partially bounded in a radially inward dimension by the radially outer surface of inner flowpath ring 143. A plurality of stator vanes are disposed circumferentially about and between the outer flowpath ring 141 and inner flowpath ring 143.

The disclosed axial compressor as described above has numerous and varied applications in the field of fluid compression. Such applications include, but are not limited to, aviation applications such as gas turbine engines for aircraft and unmanned aerial vehicles (UAVs), expendable compressor applications such as for missile propulsion systems, land- and sea-based gas turbine engines providing electrical generation and/or propulsion, and any rotating machinery generally.

The present disclosure provides many advantages over previous axial compressors. In particular, significant cost savings may be achieved by simplicity of design; reduction or elimination of numerous fasteners, discs, and seal assemblies currently required in advanced compressor designs; ease of manufacture and assembly; and substitution of less expensive composite materials for metal and metal-based materials.

According to another aspect of the present disclosure, systems and methods are disclosed for controlling the clearance between the blade tips of the rotor segment and a shroud of the axial compressor. With reference to FIGS. 4 through 10, such systems and methods are described further below.

Maintaining a proper clearance between the blade tips and the shroud segment improves the efficiency of the axial compressor and reduces or eliminates the risk of blade tip impingement upon the shroud. The clearance may need to be dynamically adjusted during compressor operation as the blades and shroud may expand and/or contract based on compressor operating conditions. Maintaining the clearance too small risks impingement; however, maintaining the clearance too large decreases the axial compressor efficiency because the working fluid is able to flow between the blades and shroud. This constitutes leakage. Thus, by presenting systems and methods for controlling blade tip clearances in an axial compressor, the present disclosure allows for improved efficiency and reduced risk of impingement.

Figure 4:
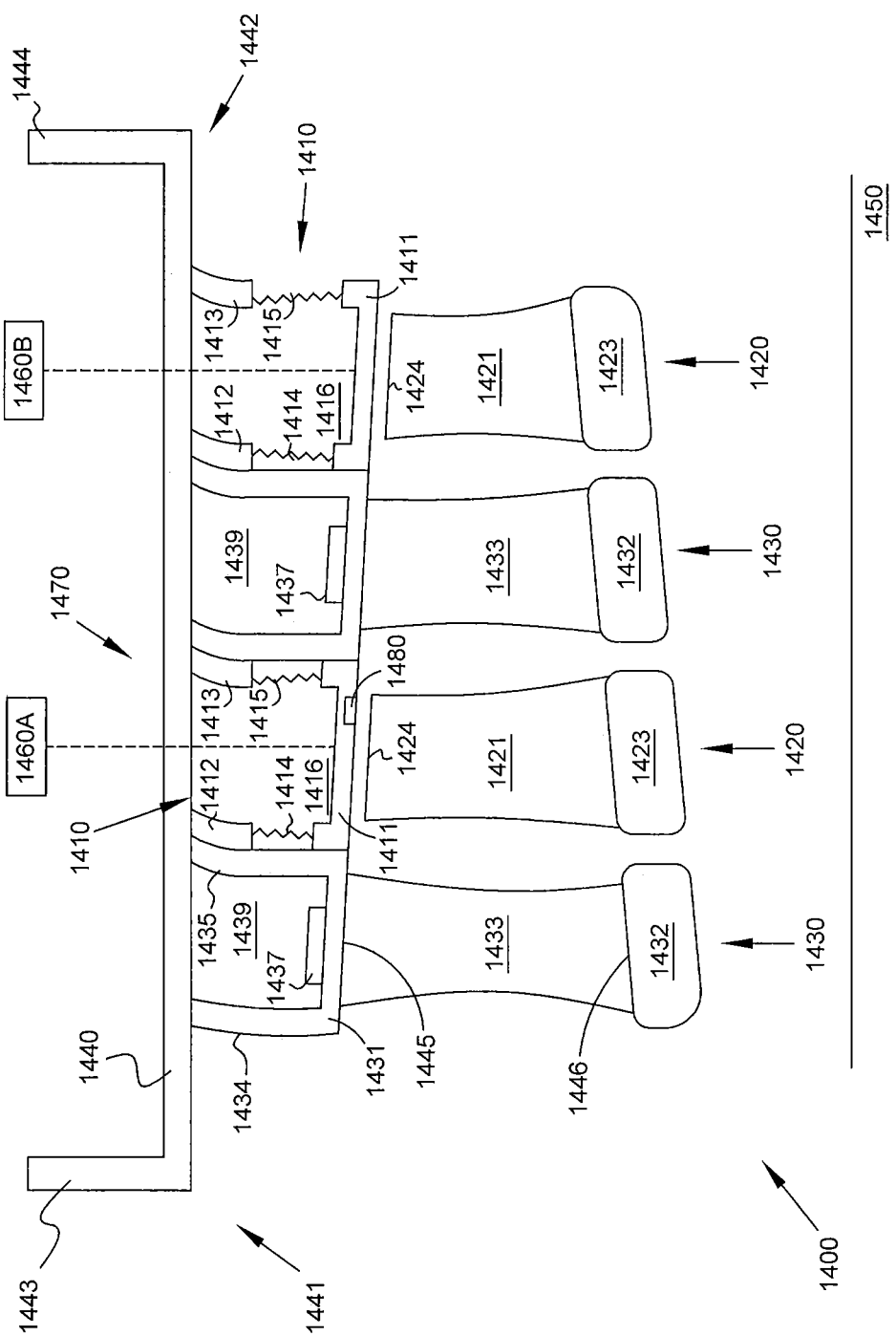
FIG. 4 is a side cutaway view of an axial compressor having a moveable shroud in accordance with some embodiments of the present disclosure.

FIG. 4 is a side cutaway view of an axial compressor 1400 having a moveable shroud 1410. In some embodiments, an axial compressor 1400 comprises at least one rotor segment 1420, shroud segment 1410, and stator segment 1430 disposed within a static casing 1440. A compressor shroud assembly 1470 comprises casing 1440, shroud segment 1410, and an actuator 1460. Compressor shroud assembly 1470 may also be referred to as a clearance control system, which controls the clearance 1455 between a blade tip 1424 and flowpath boundary member 1411, as described in greater detail below.

Static casing 1440 may be a tubular casing or a cylindrical casing, and in some embodiments may be tapered from one axial end to the other axial end. Casing 1440 provides a rigid outer frame for the axial compressor 1400. Casing 1440 may comprise a first end 1441 and second end 1442, with the first end 1441 being axially forward of the second end 1442. In some embodiments casing 1440 is conical. A conical casing 1440 may have a smaller radius at second end 1442 than at first end 1441. In some embodiments casing 1440 may be formed by a rolled ring forging or a rolled and welded plate stock. In some embodiments casing 1440 may be formed by casting or by a composite and resin method such as a wound composite fiber coated with resin and cured.

Casing 1440 may be configured to contain axial fluid flow from first end 1441 to second end 1442. In other embodiments casing 1440 may be configured to contain axial fluid flow from second end 1442 to first end 1441. Casing 1440 may be configured to encase a plurality of rotor segments 1420, a plurality of shroud segments 1410, a plurality of stator segments 1430, and a shaft 1450. Casing 1440 may be joined by forward and aft flanges 1443, 1444 to additional machine components. Shaft 1450 defines the axis of rotation A of the compressor 1400 and/or engine.

A plurality of rotor segments 1420 are disposed inside casing 1440. In some embodiments each rotor segment 1420 comprises a bladed disc having a plurality of blades 1421 coupled to a disc portion 1423. Disc portion 1423 may be adapted for coupling to shaft 1450. Blades 1421 extend radially away from the disc portion 1423 and terminate at a blade tip 1424.

During operation, rotor segments 1420 rotate with shaft 150. The motion of blades 1421 drives fluid from the axially forward first end 1441 to the axially aft second end 1442.

A plurality of stator segments 1430 are disposed inside casing 1440. Each stator segment 1430 comprises an outer flowpath ring 1431, an inner flowpath ring 1432, and a plurality of stator vanes 1433 extending between the outer flowpath ring 1431 and inner flowpath ring 1432. Stator vanes 1433 may be spaced about the circumference of outer flowpath ring 1431 and inner flowpath ring 1442. Stator segments 1430 may be referred to as a banded stator segment, as the stator vane 1433 and fluid flow may be banded between outer flowpath ring 1431 and inner flowpath ring 1432. In some embodiments one or more of the plurality of stator vanes 1433 comprise an extending member 1437 which extends through the outer flowpath ring 1431. Extending member 1437 may be used to improve coupling of stator vane 1433 to outer flowpath ring 1431 and/or to improve heat transfer in a radially outward direction.

Stator segments 1430 further comprise a pair of opposing tangs 1434, 1435 extending radially outward from the outer flowpath ring 1431 in order to space the outer flowpath ring 1431 radially inward from the casing 1440. Tangs 1434, 1435 may have curved ends which are configured to engage casing 1440 and assist in maintaining the position, once assembled, of stator segments 1430. In some embodiments stator segments 1430 may be coupled to adjacent structures using one or more fasteners (not shown). In some embodiments fasteners comprise pins which prevent rotation of stator segments 1430 during operation.

Outer flowpath ring 1431 is annular and may, in some embodiments, extend axially forward or aft such that outer flowpath ring 1431 is disposed radially outward from one or more adjacent rotor segments 1420. However, in the embodiments of FIGS. 4A and 4B, outer flowpath ring 1431 does not extend to be disposed radially outward from one or more adjacent rotor segments 1420.

Inner flowpath ring 1432 is annular and may include sealing members (not shown) which form seals in conjunction with one or more rotor segments 1420.

Together the outer flowpath ring 1431, tangs 1434, 1435, and casing 1440 form an annulus 1439 of each stator segment 1420. Tangs 1434, 1435 therefore space the outer flowpath ring 1431 from the casing 1440 and form the annulus 1439 between the outer flowpath ring 1431 and casing 1440.

During operation, stator segments 1430 remain fixed or stationary, in contrast to the rotating rotor segments 1420. Each rotor segment 1420 and stator segment 1430 pair may be referred to as a stage of the compressor 1400.

Disposed radially outward from each rotor segment 1420 may be a shroud segment 1410. Shroud segment 1410 may comprise a flowpath boundary member 1411 spaced from casing 1440 by a pair of tangs 1412, 1413. Shroud segment 1410 may further comprise a pair of flexible members 1414, 1415 coupled between tangs 1412, 1413 and the flowpath boundary member 1411. Flexible members 1414, 1415 allow for movement of the flowpath boundary member 1411 relative to casing 1440 in a radial direction. Each flowpath boundary member 1411 may be annular and may be referred to as an annular boundary member. Tangs 1412, 1413 may be configured for radial flexion relative to casing 1440.

Figure 9:
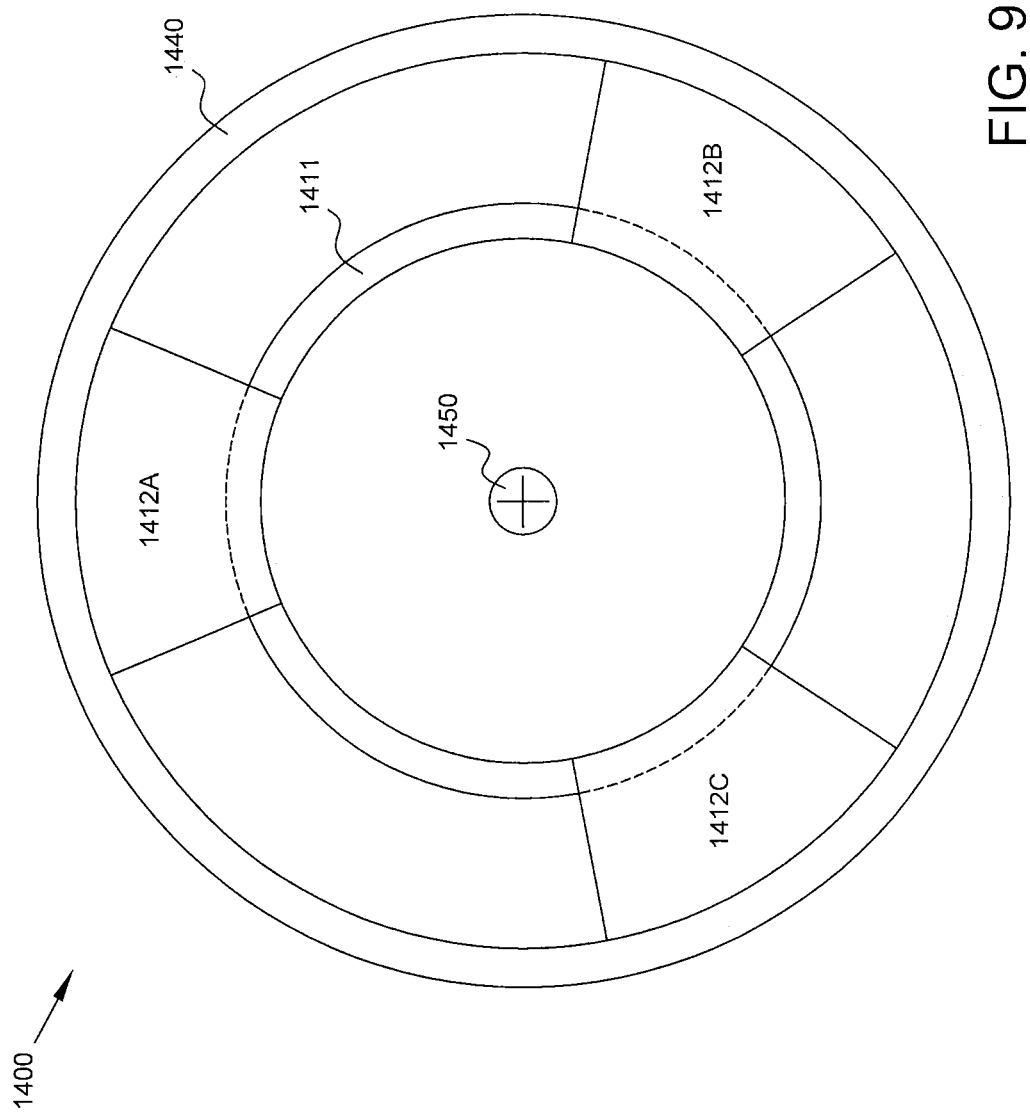
FIG. 9 is an axial cutaway view of a segmented tang in an axial compressor in accordance with some embodiments of the present disclosure.

In some embodiments, tangs 1412, 1413 extend continuously about the full circumference of casing 1440. However, in some embodiments tangs 1412, 1413 may be formed as discrete portions. For example, FIG. 9 illustrates an axial cutaway view of an embodiment of axial compressor 1400 wherein tang 1412 is formed as three discrete portions 1412A, 1412B, and 1412C. These portions are used to hold flowpath boundary member 1411 spaced inward from casing 1440 and may effect movement of flowpath boundary member 1411. Elimination of fully continuous tangs 1412, 1413 may result in cost and/or weight savings for the axial compressor 1400.

Each shroud segment 1410 may be coupled to an actuator 1460 configured to effect movement of the flowpath boundary member 1411, as described in greater detail below. As illustrated schematically in FIG. 4, in some embodiments each of a plurality of shroud segments 1410 may be coupled to a unique actuator 1460A, 1460B. In other embodiments each of the plurality of shroud segments 1410 may be coupled to a common actuator 1460.

An annular chamber 1416 may be bound by the flowpath boundary member 1411, casing 1440, and tangs 1412, 1413 including any flexible members 1414, 1415.

In some embodiments, flowpath boundary member 1411 comprises a ring that is configured for flexion. Various embodiments of a ring that may comprise the flowpath boundary member 1411 are discussed below with reference to FIGS. 8A through 8E. In other embodiments, flowpath boundary member comprises a split ring having overlapping portions. In still further embodiments, flowpath boundary member 1411 comprises a ring having at least a portion configured for flexion. In other embodiments, flowpath boundary member 1411 is itself configured to radially expand or contract.

In these embodiments, the flowpath boundary member 1411 is configured such that dynamic forces such as air pressure and temperature of the bulk flowpath, and air pressure and temperature in the annular chamber may cause changes in the circumference of the flowpath boundary member 1411. Such changes in circumference will alter the clearance between the flowpath boundary member 1411 and the blade tips 1424 of the respective blade 1421.

In some embodiments flowpath boundary member 1411 includes an abradable surface adapted to ensure that a blade tip 1424 does not impinge rigid portions of the flowpath boundary member 1411. The abradable surface may be formed from a material which is softer or more malleable than the materials which form the flowpath boundary member 1411. The abradable surface may be disposed radially outward from a blade tip 1424.

Bulk fluid flow is directed between an outer flow boundary 1445 and an inner flow boundary 1446. Outer flow boundary 1445 is formed by the radially inner surfaces of each stator segment 1430 and shroud segment 1440. Inner flow boundary 1446 is formed by the radially outer surfaces of the inner flowpath ring 1432 of each stator segment 1430 and the disc portion 1423 of each rotor segment 1420. A bulk fluid flow path is defined through the axial compressor 1400 between the outer flow boundary 1445 and inner flow boundary 1446. As fluid passes from an axially forward end 1441 of the compressor 1400 to an axially aft end 1442, it passes between blades 1421 of the rotor segments 1420 and stator vanes 1433 of the stator segments 1430.

Figure 5:
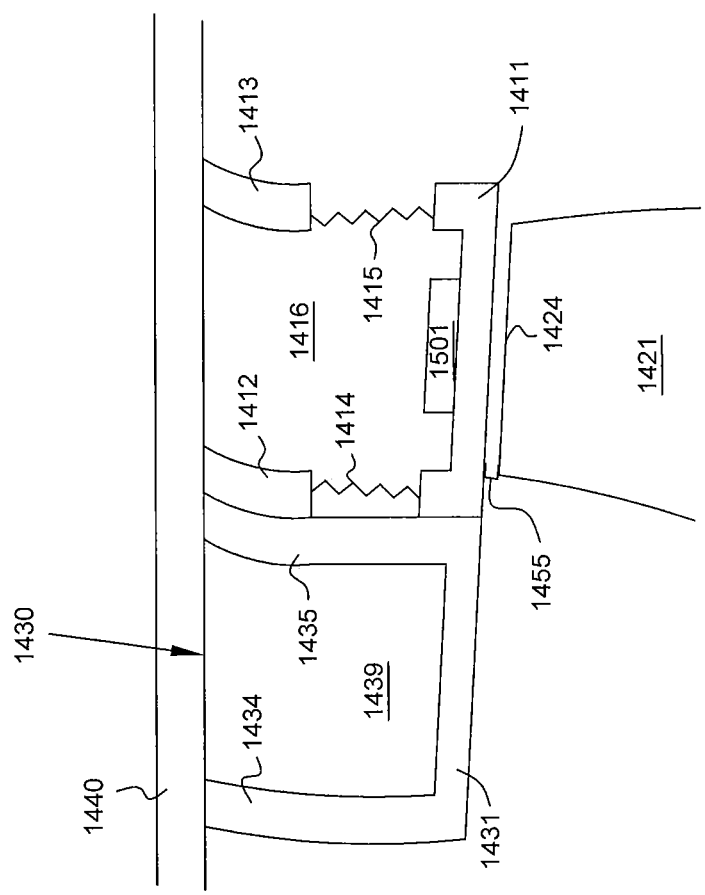
FIG. 5 is a detailed side cutaway view of a moveable shroud having an actuating ring in accordance with some embodiments of the present disclosure.
Figure 6:
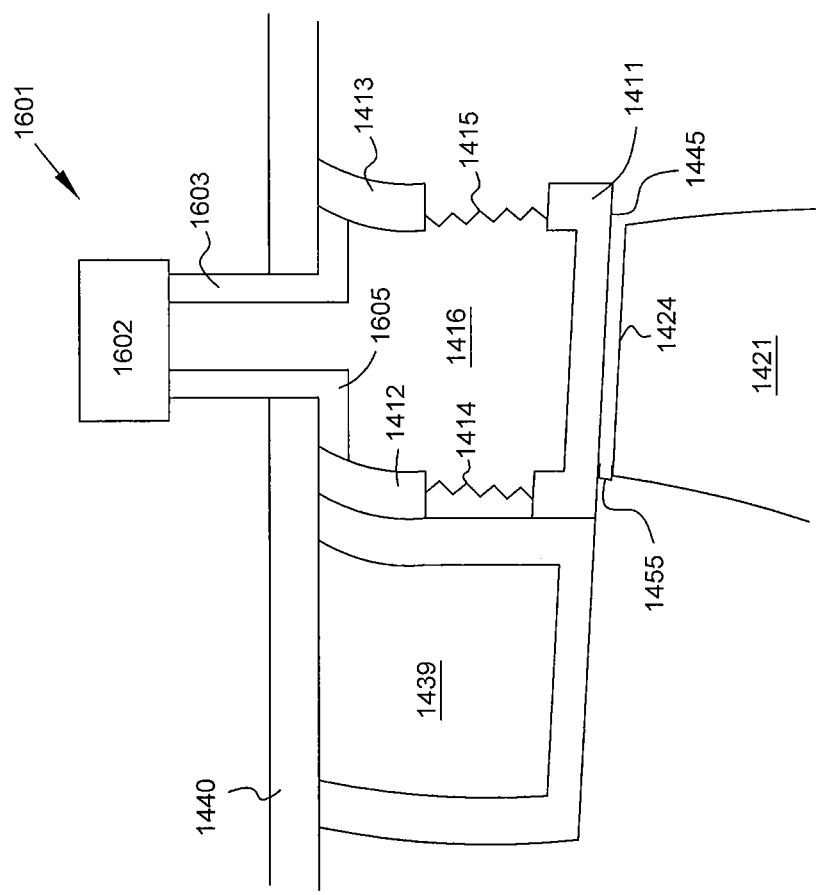
FIG. 6 is a detailed side cutaway view of a moveable shroud having a pneumatic actuator in accordance with some embodiments of the present disclosure.
Figure 7A:
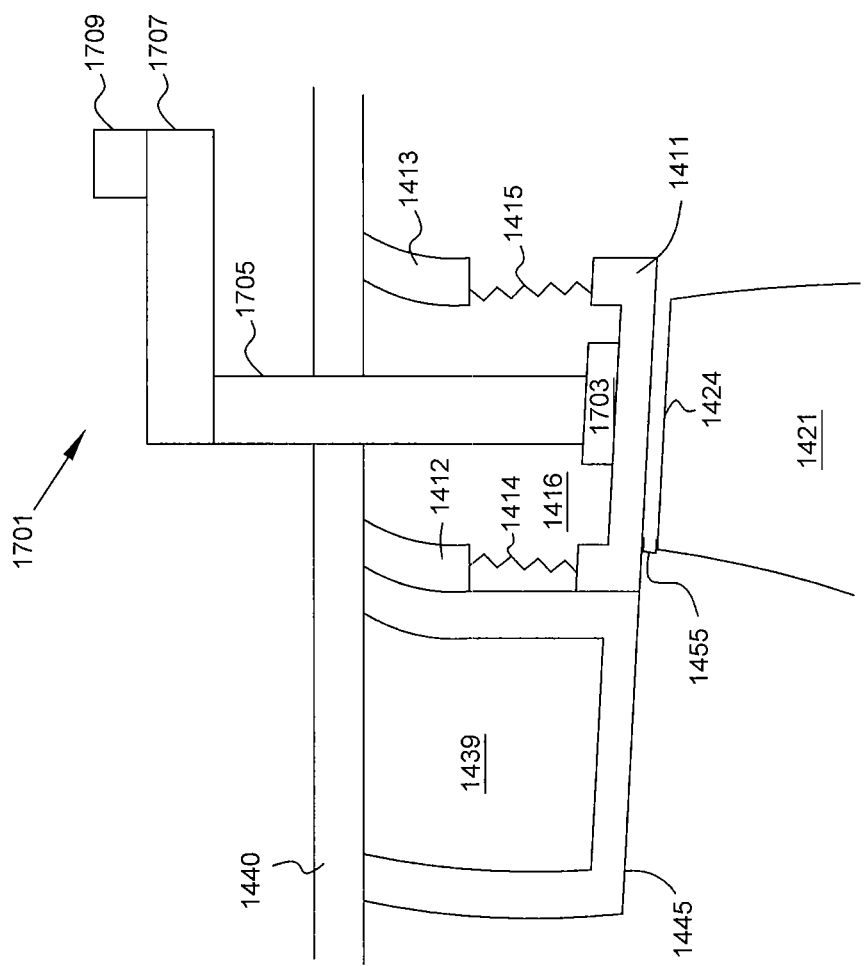
FIG. 7A is a detailed side cutaway view of a moveable shroud having a mechanical actuator in accordance with some embodiments of the present disclosure.
Figure 7B:
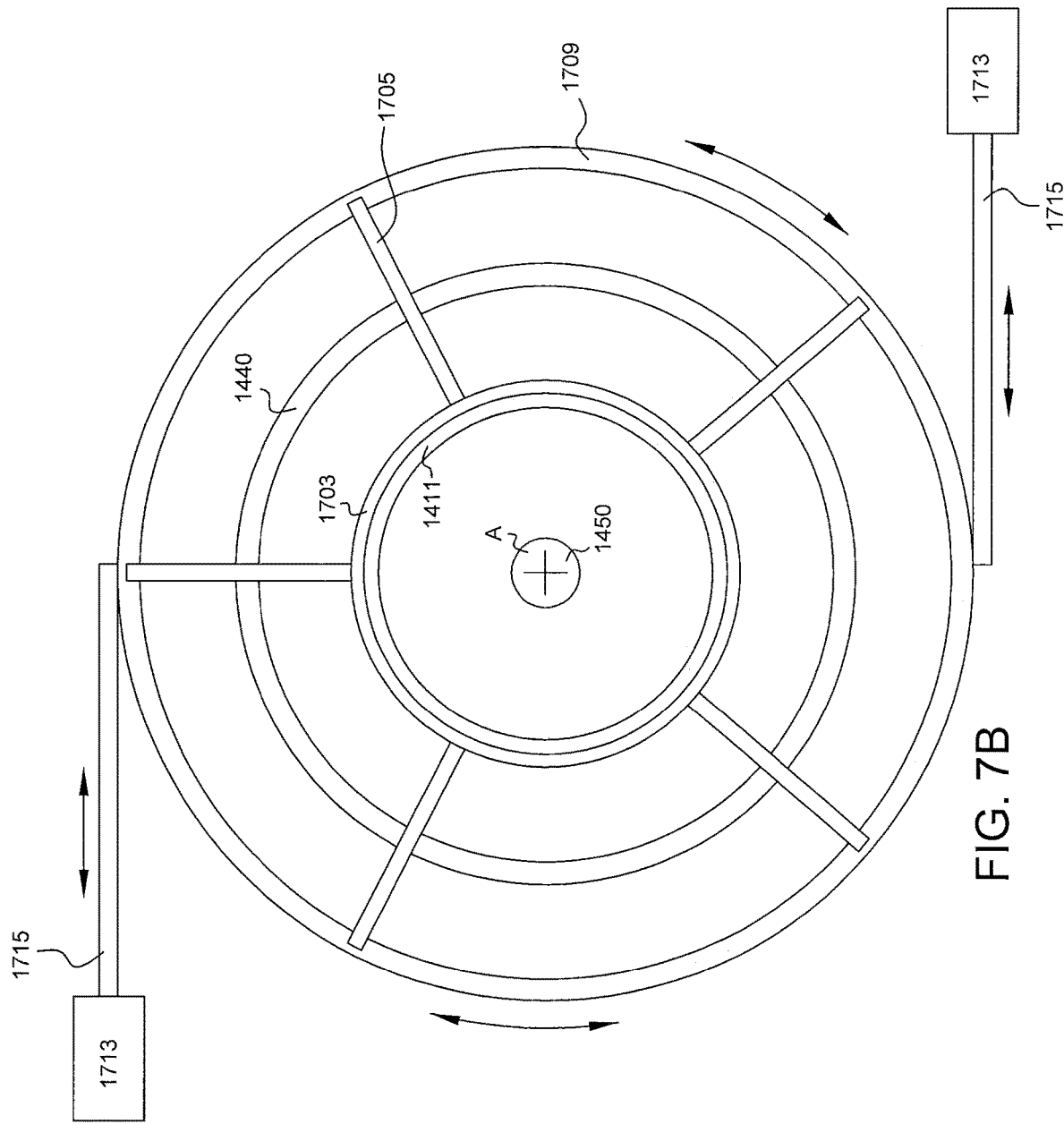
FIG. 7B is an axial cutaway view of a plurality of driving members spaced about an actuating ring in accordance with some embodiments of the present disclosure.
Figure 7C:
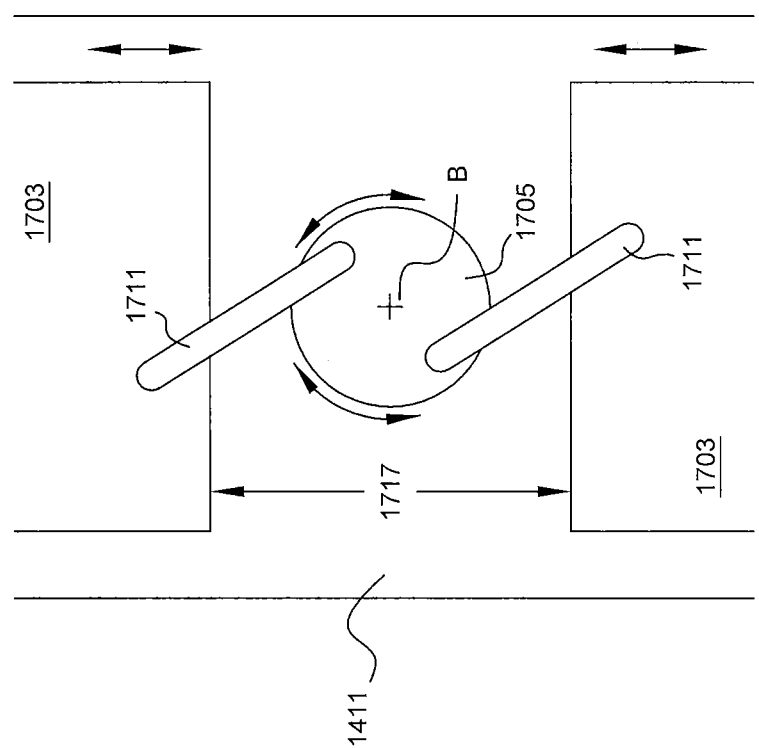
FIG. 7C is a profile view looking radially inward at the interface of a driving member and split driving ring in accordance with some embodiments of the present disclosure.
Figure 10:
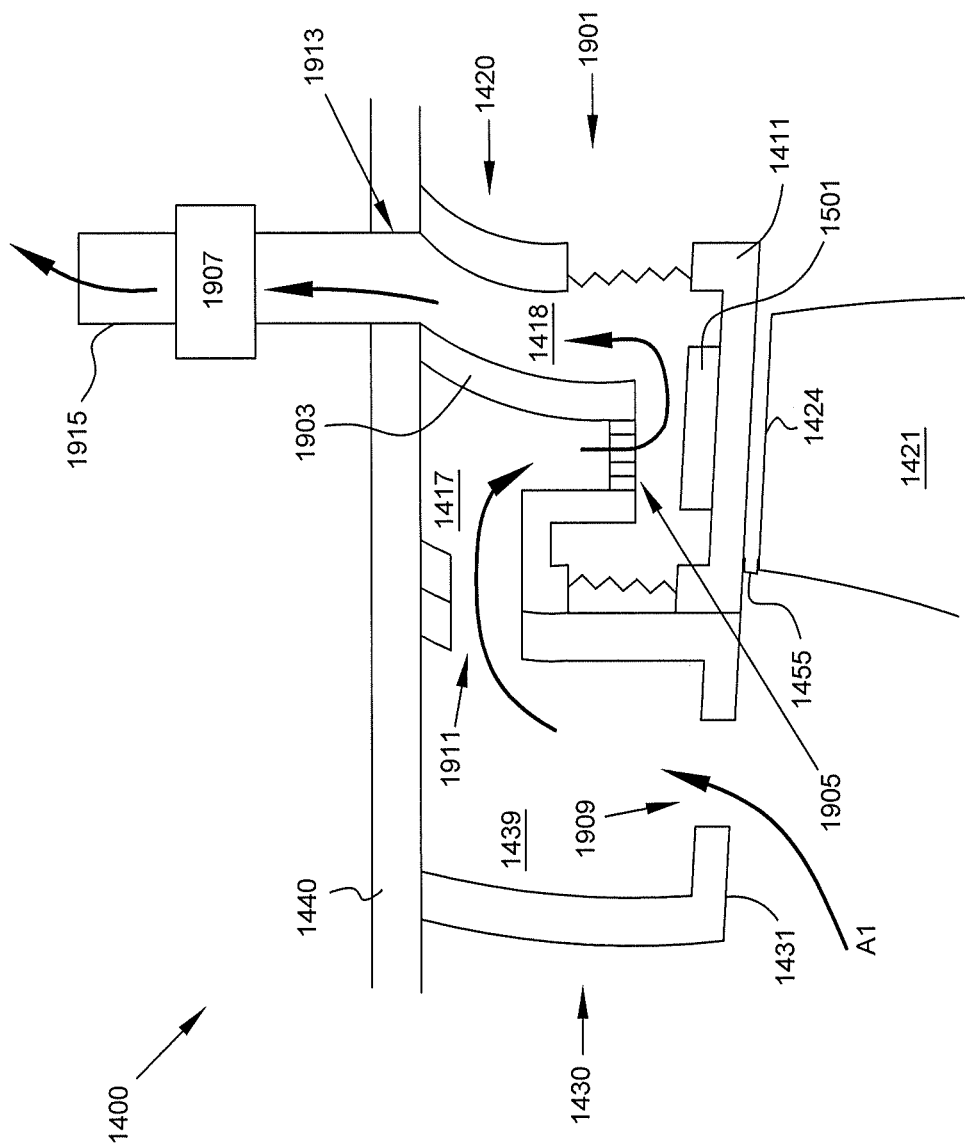
FIG. 10 is a detailed side cutaway view of a moveable shroud having a thermal actuator in accordance with some embodiments of the present disclosure.

The present disclosure contemplates several mechanisms for actuating the flowpath boundary member 1411 such that the flowpath boundary member 1411 moves radially inward or radially outward relative to casing 1440. FIG. 5 presents an embodiment of a moveable shroud segment 1410 wherein actuator 1460 is an actuating ring 1501. FIG. 6 presents an embodiment of a moveable shroud segment 1410 wherein actuator 1460 is a pneumatic actuator 1601. FIGS. 7A, 7B, and 7C present an embodiment of a moveable shroud segment 1410 wherein actuator 1460 is a mechanical actuator 1701. FIG. 10 presents an embodiment of a moveable shroud segment 1410 wherein actuator 1460 is a thermal actuator 1901.

FIG. 5 is a detailed side cutaway view of a moveable shroud segment 1410 having an actuating ring 1501 in accordance with some embodiments of the present disclosure. In some embodiments, actuator 1460 comprises a ring 1501 which is configured to radially expand or contract responsive to compressor operating conditions. In some embodiments, actuator 1460 comprises a ring 1501 which is configured to radially expand or contract responsive to stimulus.

In some embodiments, flowpath boundary member 1411 comprises a ring 1501 that is configured for flexion, which may be referred to as an actuating ring. The ring 1501 may be formed as a unitary member or may be formed as discrete and joined members. Ring 1501 may further be formed integrally with the flowpath boundary member 1411 or formed separately and coupled to the flowpath boundary member 1411.

Figure 8C:
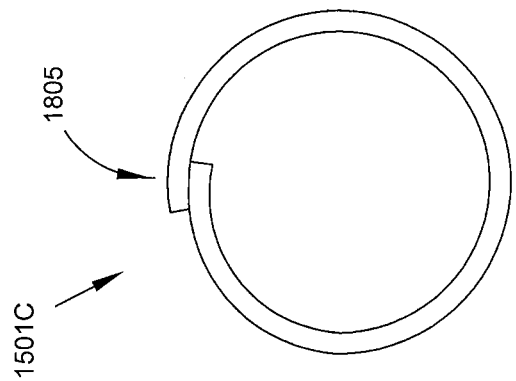
FIG. 8C is an axial profile view of an actuating ring having an overlapping portion in accordance with some embodiments of the present disclosure.

To ensure that ring 1501 is capable of sufficient expansion and contraction to effect movement of the flowpath boundary member 1411, various embodiments may use one of several forms of ring 1501. For example, in FIG. 8A is presented a unitary ring 1501A. The ring 1501A shown in FIG. 8A is made as a unitary member and is formed from a material having sufficient material properties to allow the ring 1501A to expand and contract over the full range of motion required for blade tip clearance control.

Figure 8B:
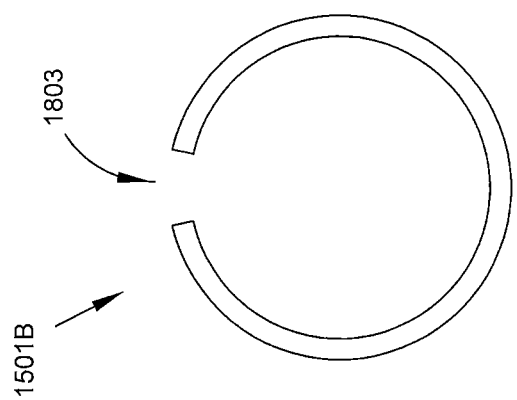
FIG. 8B is an axial profile view of a split actuating ring in accordance with some embodiments of the present disclosure.
Figure 8A:
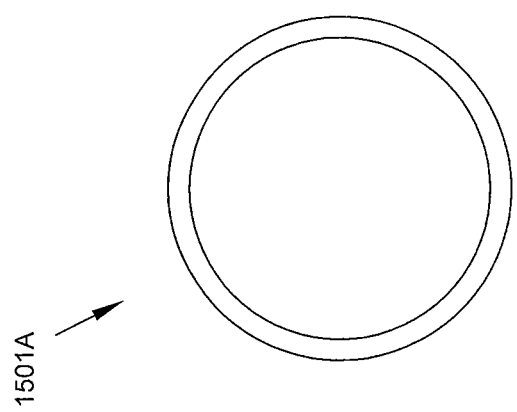
FIG. 8A is an axial profile view of an actuating ring in accordance with some embodiments of the present disclosure.

In other embodiments, a split ring 1501B such as that illustrated in FIG. 8B may be utilized. Split ring 1501B may be formed as a unitary member having a gap 1803 therein to allow greater flexion, expansion, and/or contraction of the ring 1501B.

In other embodiments, an overlapping ring 1501C such as that illustrated in FIG. 8C may be utilized. An overlapping portion 1805 is provided such that greater flexion, expansion, and/or contraction is provided as compared to the unitary ring 1501A, while still allowing overlapping ring 1501C to maintain a flow boundary if necessary.

Figure 8E:
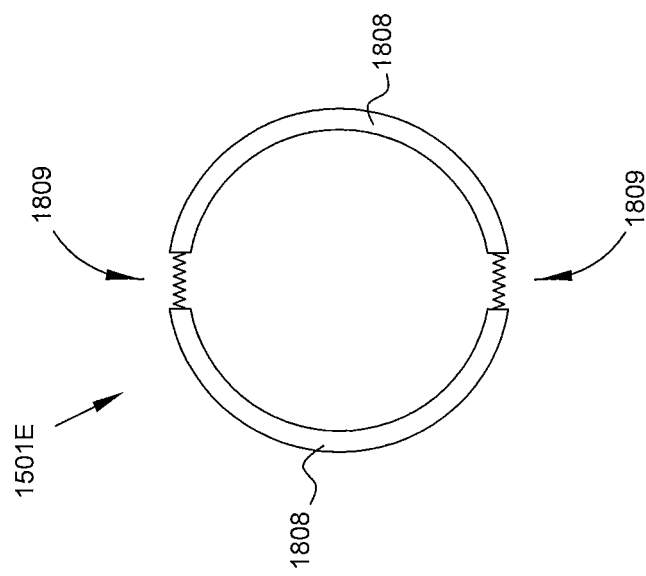
FIG. 8E is an axial profile view of an actuating ring having flexible portions in accordance with some embodiments of the present disclosure.
Figure 8D:
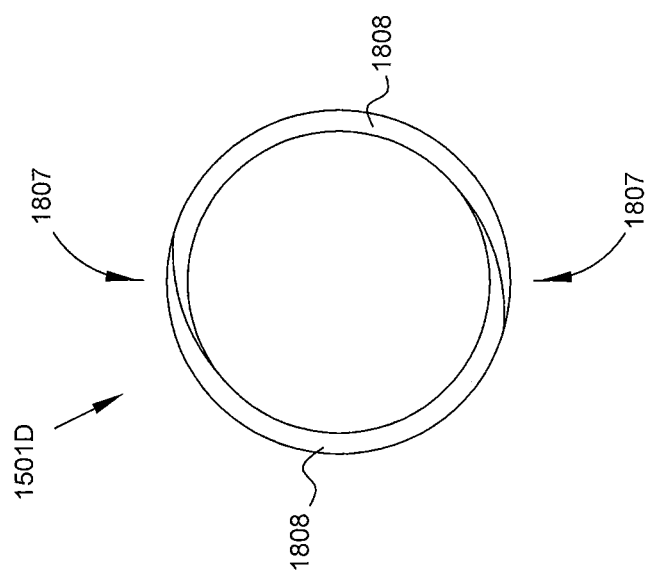
FIG. 8D is an axial profile view of an actuating ring having overlapping portions in accordance with some embodiments of the present disclosure.

In other embodiments, ring 1501D having slideable overlapping portions 1807 such as that illustrated in FIG. 8D may be utilized. Ring 1501D may be formed as two or more parts 1808, each part 1808 slideably coupled to one or more other parts 1808 to form a complete ring 1501D. The slideable couplings of two or more parts 1808 provide overlapping portions which allow for ring 1501D to maintain a flow boundary if necessary.

In other embodiments, ring 1501E having one or more flexible portions 1809 such as that illustrated in FIG. 8E may be utilized. Ring 1501E may be formed as one or more parts 1808 which are flexibly coupled by one or more flexible portions 1809. The flexible portions 1809 are configured to effect flexion, expansion and/or contraction of the ring 1501E.

In those embodiments wherein flowpath boundary member 1411 comprises or is coupled to a ring 1501, the flowpath boundary member 1411 and/or ring 1501 are configured such that dynamic forces such as air pressure and temperature of the bulk flowpath, and air pressure and temperature in the annular chamber may cause changes in the circumference of the flowpath boundary member 1411 and/or ring 1501. Such changes in circumference will alter the clearance between the flowpath boundary member 1411 and/or ring 1501 and the blade tips 1424 of the respective blade 1421. In some embodiments flowpath boundary member 1411 and/or ring 1501 are configured to respond primarily to changes in temperature and expand or contact based on those changes.

Ring 1501 may be formed of a material having sufficient flexion to effect movement of the flowpath boundary member 1411 in a radially outward direction hen the ring 1501 is radially flexed. In some embodiments ring 1501 is formed from a material having a different rate of thermal expansion from the material used to form the flowpath boundary member 1411.

FIG. 6 is a detailed side cutaway view of a moveable shroud segment 1410 having a pneumatic actuator 1601 in accordance with some embodiments of the present disclosure. A pneumatic actuator 1601 may be coupled directly to flowpath boundary member 1411, or, as illustrated in FIG. 6, may be fluidly coupled to annular chamber 1416 so as to effect movement of flowpath boundary member 1411.

In the illustrated embodiment, pneumatic actuator 1601 comprises an air source 1602 coupled to annular chamber 1416 by a tube 1603. In some embodiments air source 1602 is discharge air of the axial compressor 1400. In some embodiments a sealing member 1605 may be used to sealingly couple the tube 1603 through casing 1440 and to tangs 1412, 1413. In some embodiments tube 1603 includes a valve (not shown) for controlling air flow into and out of the annular chamber 1416.

In some embodiments pneumatic actuator 1601 coupled to annular chamber 1416 forms a pneumatic piston configured to effect movement in a radially inward or radially outward direction of the flowpath boundary member 1411. In such a configuration, annular chamber 1416 may be referred to as an actuating chamber.

Pneumatic actuator 1601 operates to direct high pressure air into the annular chamber 1416, thus causing flexion of flexible members 1414, 1415 and effecting movement of flowpath boundary member 1411 in a radially inward direction. Pneumatic actuator 1601 may also operate to remove high pressure air from annular chamber 1416, or allow the pressure of annular chamber 1416 to drop due to parasitic losses, thus effecting movement of flowpath boundary member 1411 in a radially outward direction. Movement of flowpath boundary member 1411 relative to casing 1440 is used to control blade tip clearance 1455. In other words, the movement of flowpath boundary member 1411 in a radially inward or radially outward direction adjusts the clearance 1455 between the flowpath boundary member 1411 and blade tips 1424.

FIGS. 7A, 7B, and 7C present an embodiment of a moveable shroud segment 1410 wherein actuator 1460 is a mechanical actuator 1701. A mechanical actuator 1701 is a device which mechanically drives movement of the flowpath boundary member 1411 in a radially inward or radially outward direction. FIG. 7A is a detailed side cutaway view of a moveable shroud segment 1410 having a mechanical actuator 1701 in accordance with some embodiments of the present disclosure. FIG. 7B. FIG. 7C. Additional mechanical drivers for the flowpath boundary member 1411 are contemplated beyond the specific implementation of a mechanical actuator 1701 that is illustrated and described below In the illustrated embodiment mechanical actuator 1701 comprises a split driving ring 1703, driving member 1705, translating arm 1707, and articulating ring 1709. Split driving ring 1703 is coupled between the flowpath boundary member 1411 and the driving member 1705. Translating arm 1707 is coupled between the driving member 1705 and articulating ring 1709.

The operation of the articulating ring 1709 is illustrated in greater detail in FIG. 7B, which shows an axial cutaway view. Articulating ring 1709 is configured to articulate about the axis of rotation A of the compressor 1400. Articulating ring 1709 may be coupled to a pair of driving mechanisms 1713 via a respective lateral arm 1715. Each driving mechanism 1713 may effect lateral motion of a respective lateral arm 1715, which is translated to an articulating motion of articulating ring 1709. This articulating motion of the articulating ring 1709 is translated by translating arm 1707 to a rotational motion to driving member 1705. Driving member 1705 rotates about its own axis of rotation B. In some embodiments axis of rotation B is perpendicular to axis of rotation A of the compressor 1400.

A plurality of driving members 1705 may be provided to effect movement of flowpath boundary member 1411, and may be spaced about the circumference of articulating ring 1709, casing 1440, and/or flowpath boundary member 1411. Driving members 1705 are coupled to articulating ring 1709 by translating arm 1707, pass through casing 1440, and are coupled to split driving ring 1703.

Split driving ring 1703 is illustrated in greater detail in FIG. 7C, which shows a profile view looking in a radially inward direction. Driving member 1705 is disposed in a gap 1717 of the split ring 1703, and coupled to split ring 1703 by a pair of angled arms 1711. The rotation of driving member 1705, caused by articulation of the articulating ring 1709, is translated by angled arms 1711 into lateral or circumferential motion of split ring 1703. Depending on the direction of rotation of the driving member 1705, angled arms 1711 may either push split ring 1703 further apart (i.e. increase gap 1717) and thus effect expansion of the split ring 1703, or pull split ring 1703 closer together (i.e. increase gap 1717) and thus effect contraction of the split ring 1703. Expansion or contraction of the split ring 1703 results in respective expansion or contraction of the flowpath boundary member 1411, thus effecting movement of the flowpath boundary member 1411 in a radially inward or radially outward direction relative to the casing 1440.

FIG. 10 presents an embodiment of a moveable shroud segment 1410 wherein actuator 1460 is a thermal actuator 1901. A thermal actuator 1901 wherein the position of the flowpath boundary layer 1411 is controlled by controlling the temperature of one or more of the flowpath boundary layer 1411, an actuating ring 1501, and/or the fluid of the annular chamber 1416. FIG. 10 provides an illustration of one such thermal actuator 1901.

In the illustrated embodiment, thermal actuator 1901 comprises a fluid flowpath A1 and a chamber divider 1903 disposed within annular chamber 1416. In some embodiments thermal actuator further comprises an actuating ring 1501 that is coupled to flowpath boundary member 1411.

Annular chamber 1416 is divided by chamber divider 1903 into a first chamber portion 1417 and a second chamber portion 1418. Fluid flowpath A1 is formed by a first aperture 1909 which allows fluid communication between annulus 1439 and the bulk flowpath, a second aperture 1911 which allows fluid communication between annulus 1439 and first chamber portion 1417, one or more of third apertures 1905 which allow fluid communication between first chamber portion 1417 and second chamber portion 1418, and a fourth aperture 1913 which allows fluid communication between second chamber portion 1418 and a region external to casing 1440. In some embodiments fluid exiting the casing 1440 via the fourth aperture 1913 enters a tube 1915 and then is passed into a region external to casing 1440. In some embodiments a valve 1907 may be provided and coupled to the tube 1915, the valve 1907 being configured to throttle fluid flow.

In some embodiments the first aperture 1909 is disposed in the outer flowpath boundary 1431 of an adjacent stator segment 1430. However, in other embodiments the first aperture 1909 may be disposed in an outer flowpath boundary 1431 of a more distant stator segment 1430, and additional apertures may be provided between respective annuli 1439 and respective annular chambers 1416 to allow a fluid flowpath A1 between the first aperture 1909 and fourth aperture 1913. Locating the first aperture 1909 further upstream than the adjacent stator segment 1430 may result in cooler air being admitted through fluid flowpath A1.

The flow of relatively cooler air over actuating ring 1501 and/or flowpath boundary member 1411 may result in expansion or contraction of the actuating ring 1501 and/or flowpath boundary member 1411. Additionally, controlling the flow rate of relatively cooler air through the fluid flowpath A1 by throttling valve 1907 allows for close control of the air temperature in second chamber portion 1418 and thus of the degree of expansion or contraction of actuating ring 1501 and/or flowpath boundary member 1411. Controlling expansion or contraction of actuating ring 1501 and/or flowpath boundary member 1411 allow for control of blade tip clearance 1455 by moving the flowpath boundary member 1411 in a radially inward or radially outward direction.

In operation, thermal, mechanical, and pressure forces act on the various components of the axial compressor 1400 causing variation in the blade tip clearance. It is therefore desirable to control the blade tip clearance over a wide range of steady state and transient operating conditions. The disclosed systems and methods provide blade tip clearance control by positioning shroud segments 1410 relative to blade tips 1424.

In some embodiments during operation of axial compressor 1400 blade tip clearance 1455 is monitored by periodic or continuous measurement of the distance between flowpath boundary member 1411 and blade tips 1424 using one or more sensors 1480 positioned at selected points along one or more of the flowpath boundary members 1411. When clearance 1455 is larger than a predetermined threshold, it may be desirable to reduce the clearance 1455 to prevent leakage and thus improve centrifugal compressor efficiency. One of the disclosed actuators 1460 may be actuated based on measured blade tip clearance 1455 to move flowpath boundary member 1411 and thus adjust the blade tip clearance 1455 as desired.

In other embodiments, engine testing may be performed to determine blade tip clearance 1455 for various operating parameters and a schedule is developed for the actuator 1460 based on different modes of operation. For example, based on clearance 1455 testing, actuator 1460 may actuate a predetermined degree for cold engine start-up, warm engine start-up, steady state operation, and max power operation conditions. As another example, a table may be created based on blade tip clearance 1455 testing, and actuator 1460 actuation is adjusted according to operating temperatures and pressures of the axial compressor 1400. A sensor 1480 may be used to monitor the degree of actuation of actuator 1460. Thus, based on monitoring the operating conditions of the axial compressor 1400 such as inlet pressure, discharge pressure, and/or working fluid temperature, a desired blade tip clearance 1455 is achieved according to a predetermined schedule of actuation for actuator 1460.

Axial compressor 1400 may be assembled by sequentially loading compressor components into the casing 1440. First, a shroud segment 1410 is inserted at first end 1441 and moved axially aft into a position proximate or abutting second end 1442. Next, a rotor segment is inserted at first end 1441 and moved axially aft to be disposed radially inward from the shroud segment 1410. Next, a stator segment 1430 is inserted at first end 1441 and moved axially aft into a position proximate or abutting the shroud segment 1410. These steps may be repeated as necessary to complete the assembly of a multi-stage axial compressor. Shroud segments 1410 may be coupled to one or more actuators 1460 during the assembly process.

The present disclosure additionally discloses a method of reducing blade tip rub or impingement. The method comprises providing a shroud 1410 spaced radially inward from the casing 1440 and forming a flowpath boundary 1411 around the bladed disk 1423, and radially expanding and contracting the shroud 1410. The method may further comprise measuring a clearance gap 1455 between the blade tips 1424 of the rotating bladed disk and the shroud 1410. The method may further comprise radially expanding and contracting the shroud 1410 responsive to the measured clearance gap 1455.

The present disclosure provides numerous advantages over the prior art. In particular, significant cost savings may be achieved by simplicity of design; reduction or elimination of numerous fasteners, discs, and seal assemblies currently required in advanced compressor designs; ease of manufacture and assembly; and substitution of less expensive composite materials for metal and metal-based materials. The disclosure of systems and methods for controlling blade tip clearance will improve axial compressor efficiency by reducing fluid flow losses and will reduce the risk of blade tip impingement upon the shroud.

Although examples are illustrated and described herein, embodiments are nevertheless not limited to the details shown, since various modifications and structural changes may be made therein by those of ordinary skill within the scope and range of equivalents of the claims.

What is claimed is:

1. A compressor shroud assembly in a turbine engine having a dynamically moveable shroud segment for encasing a rotor segment comprising a bladed disc in an axial compressor and maintaining a clearance gap between the shroud segment and the blade tips of the bladed disc, said assembly comprising:
   a static compressor casing;
   a shroud segment mounted to said casing, said shroud segment comprising a flowpath boundary member spaced radially inward from said casing, said flowpath boundary member being moveable relative to said casing in a radial direction, wherein said flowpath boundary member is spaced radially inward from said casing by a pair of tangs each extending from the casing to the flowpath boundary member, each of said tangs configured for radial flexion relative to said casing; and
   an actuator mounted to said casing and coupled to said shroud segment for effecting the movement of said flowpath boundary member.

2. The compressor shroud assembly of claim 1, wherein said flowpath boundary member comprises a ring configured for radial flexion.

3. The compressor shroud assembly of claim 1, wherein said flowpath boundary member comprises a split ring having a slideable overlapping portion.

4. The compressor shroud assembly of claim 1, wherein said flowpath boundary member comprises a ring having a portion configured for radial flexion.

5. The compressor shroud assembly of claim 1, wherein said flowpath boundary member comprises a ring formed from a material having sufficient flexion to effect movement of said member in a radially outward direction when said member is radially flexed.

6. The compressor shroud assembly of claim 1, wherein said flowpath boundary member and said tangs at least partially bound an annular chamber, and wherein said actuator operates to direct pressurized air into said annular chamber.

7. The compressor shroud assembly of claim 6, wherein said actuator operates to direct compressor discharge air into said annular chamber.

8. The compressor shroud assembly of claim 1, wherein said actuator comprises an actuating ring coupled to said flowpath boundary member, said actuating ring comprising a material having a different rate of thermal expansion than the material comprising said flowpath boundary member.

9. The compressor shroud assembly of claim 1, wherein said actuating ring is mechanically driven to thereby effect movement of said flowpath boundary member.

10. The compressor shroud assembly of claim 1, wherein said assembly further comprises a sensor for measuring a clearance gap between said flowpath boundary member and the blade tips of the bladed disc and providing an output, wherein said actuator operates responsive to said sensor output.

11. An axial compressor in a turbine engine comprising:
   a rotatable shaft forming an axis of the engine;
   a rotor segment having a bladed disk mounted to said shaft;
   a static casing providing a rigid outer frame for said compressor;
   a shroud segment mounted to said casing, said shroud segment having an annular boundary member spaced radially inward from said casing and forming a flowpath boundary around said bladed disk, said annular boundary member being configured to radially expand and contract, wherein said annular boundary member is spaced radially inward from said casing by a pair of tangs each extending from the casing to the annular boundary member, each of said tangs configured for radial flexion relative to said casing; and an actuator configured to radially expand and contract said annular boundary member.

12. The axial compressor of claim 11, further comprising a pneumatic piston.

13. The axial compressor of claim 12, wherein said piston is actuated by air directed from the compressor discharge.

14. The axial compressor of claim 12, wherein said piston comprises an actuating chamber bounded at least in part by said annular boundary member.

15. The axial compressor of claim 11, wherein said actuator comprises an actuating ring coupled to said annular boundary member.

16. The axial compressor of claim 15, wherein said actuating ring is mechanically driven to thereby radially expand or contract said annular boundary member.

17. The axial compressor of claim 15, wherein said actuator ring comprises a material having a rate of thermal expansion different than the annular boundary member.

18. In an axial compressor having a static casing and a rotating bladed disk, a method of reducing blade tip rub comprising:

providing a shroud segment spaced radially inward from the casing and forming a flowpath boundary comprising at least one flowpath boundary member around the bladed disk, wherein said flowpath boundary member is spaced radially inward from said casing by a pair of tangs each extending from the casing to the flowpath boundary member, each of said tangs configured for radial flexion relative to said casing, and radially expanding and contracting the shroud segment.

19. The method of claim 18 further comprising:

measuring a clearance gap between the blade tips of the rotating bladed disk and the shroud segment; and radially expanding and contracting the shroud segment responsive to the measured clearance gap.

* * * * *